July 1, 1924.

A. D. PERKINS

WINDSHIELD FOR AUTOMOBILES

Filed Oct. 8, 1921

Alonzo D. Perkins
INVENTOR

BY W. P. Preble
ATTORNEY

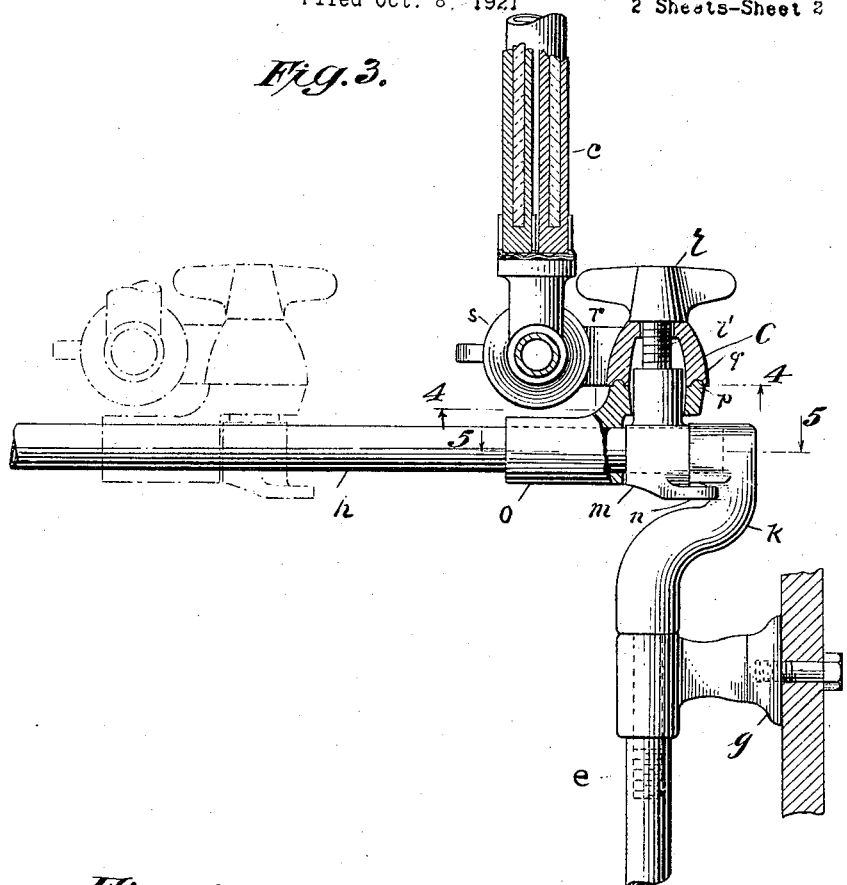

Patented July 1, 1924.

1,499,869

UNITED STATES PATENT OFFICE.

ALONSON D. PERKINS, OF NEW YORK, N. Y.

WINDSHIELD FOR AUTOMOBILES.

Application filed October 8, 1921. Serial No. 506,240.

*To all whom it may concern:*

Be it known that I, ALONSON D. PERKINS, a citizen of the United States of America, and a resident of the city, county, and State of New York (whose post-office address is 1931 Broadway, New York city), have invented certain new and useful Improvements in windshields for automobiles, of which the following is a specification.

The object of my invention is to provide a wind shield for automobiles, more particularly of the type known as tonneau wind shields, and of the construction which I have designated as the table type. This construction is such that the wind shield when not needed as a screen against wind, dust, or weather, may be folded down into a horizontal position reaching, if desired, over the knees of the occupants of the tonneau and being held firmly in such horizontal position, can be used as a table for either luncheon, cards, or other social requirements.

Another purpose of this construction is that the supporting devices for the wind shield are so adapted to each other that when used as a wind screen the shield may be set at any desired angle of deflection so that the course of the wind is deflected sidewise in the car at any angle found necessary or desirable.

Wind shields of the table type may be used with various types of supports whether folding or extensible, but I have selected the folding arm construction for purposes of illustration herein.

One form of my improved windshield is shown in the accompanying drawings in which Fig. 1 is an elevation as viewed from the rear seat of the automobile to which it is attached; the supporting brackets being folded in against the back of the front seat and the side wings partly extended.

Fig. 3 is a detail section view of one of the side members of the shield including the folding arm and the combination swivelled joint.

Figure 1:
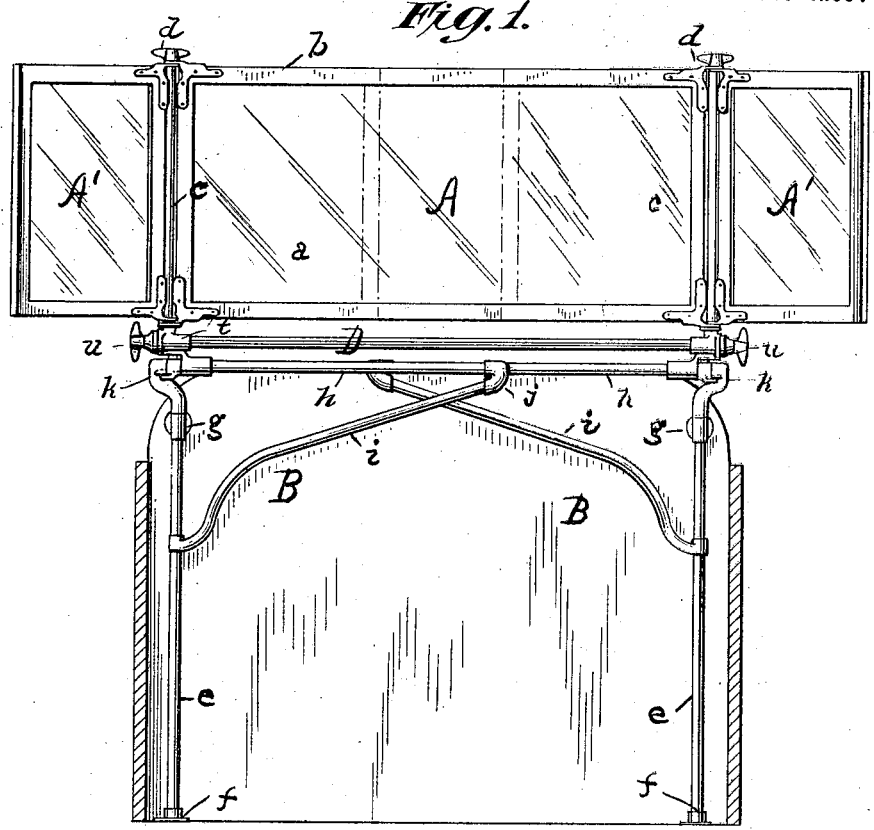

Figs. 4 and 5 are detail sections as indicated on lines 4—4 and 5—5 respectively in Fig. 3.

Same letters indicate similar parts in different figures.

A is the main screen which consists ordinarily of heavy plate glass (*a*) mounted in a suitable metallic frame (*b*) and removably supported by hinge pins (*c*) and stiffened by the winged nuts (*d*). At each side of the main screen is a side screen or wing (A') similarly framed and supported.

B, B are the supporting brackets upon which the whole structure is mounted. These brackets are preferably mounted so that the vertical leg (*e*) of the bracket rests in a socket (*f*) secured to the floor of the car, and steadied near the upper end of said leg by a bearing (*g*) secured to the back of the front seat. By this construction I provide a folding support for the wind shield as strong, substantial, and effective in operation, as the folding bracket-legs of the so-called well known folding tables where the side leaf, normally vertical, is raised and then maintained in a horizontal position by the unfolding brackets.

The horizontal and inclined arms of the bracket (*h*, *i*) are connected preferably at the forward end by the coupling (*j*). The vertical leg (*e*) and the horizontal arm (*h*) are connected by a coupling (*k*) of unusual shape, one purpose of which is to secure an offset of such extent that not only can a wider, or longer, main shield be mounted and manipulated upon the supporting brackets when of the standard distance apart, without interfering with the operation of the wind shield or with passengers getting into or out of the car.

C is the combined swivelled joint or clutch which is slidably mounted on the arms (*h*) of the bracket and held rigidly thereto in any desired position by the winged nut (*l*) threaded on the pin (*l'*) rising from the slide piece (*m*) which is revolubly and slidably mounted upon the arm (*h*). This slide piece, as shown more clearly in Fig. 3, terminates at what may be called its rear end in a fork (*n*) of a size to engage the outer surface of the coupling (*k*) and be readily locked thereto when the winged nut (*l*) is screwed home.

Hung upon this slide piece is the lower member of the clutch which is capable of sliding on and revolving around the arm (*h*) and in unison with the slide piece (*m*). The horizontal portion of this lower member is provided with a number of upwardly projecting knobs or teeth (*p*) which engage the corresponding depressions (*q*) in the rear portion of the upper clutch member (r). When these knobs and projections register with each other the upper and lower members of the swivelled clutch are securely held together by the pressure of the winged nut (l).

On the forward end or branch of the upper member is a similar clutch surface (s) at right angles to the first mentioned clutch member, and to this is secured the socket of the hinge pin (c) by the registering of knobs and teeth on slide (t) (see Fig. 1) in which the said hinge pin (c) is screwed or otherwise fastened. The gripping of this secondary clutch, as it may be called, is secured by the winged nuts (u) (see Fig. 1).

All the parts and details above described can be produced of standard and interchangeable sizes and most of them in the form of castings which are to be buffed and nickel plated preferably and serve to give the wind shield greater adjustability and efficiency than any other tonneau wind shield with which I am familiar.

The operation of my improved wind shield may be briefly described as follows:—

When out of use the whole shield, including the supporting arms, are to be folded down and in, out of the way at the rear of the front seat; the two side wings being folded over upon the middle or main screen by loosening the winged nuts (d, d), which are to be tightened to prevent flapping after the folding of the side wings is completed.

Figure 2:
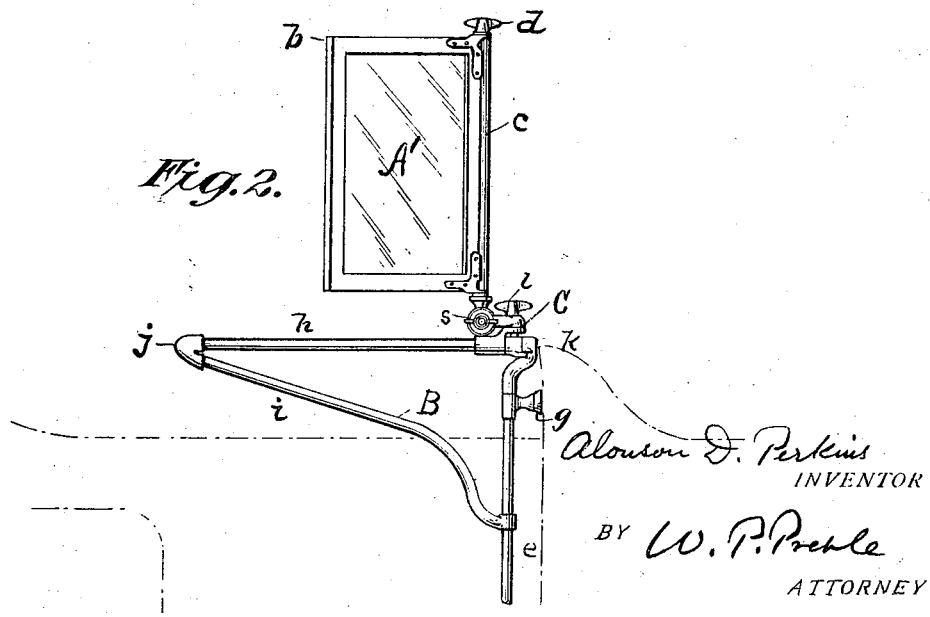
Fig. 2 is a side elevation looking from the right side of the car but with the folding brackets in their open or normally extended position.

The folded screen has been revolved from the upright position shown in Fig. 1 to a pendant position (not shown) by loosening the combined clutch by turning the winged nuts (u); which of course are to be re-tightened when the screen has reached its desired downward position. The supporting brackets have previously been folded inwardly so as to overlap as shown in Fig. 1 from the position shown in Fig. 2.

When it is desired to use the screen either as a table or as a wind screen the winged nuts (u) are first loosened so as to release the clutching surfaces of the slides (t, t). The screen may then be raised into the desired position and by tightening these clutches secured firmly in said position. The screen and its connecting rod (D) (see Fig. 1) having now been turned up out of the way of the folding brackets, these brackets are now unfolded sufficiently to permit the sliding of the combined clutches toward the rear seat on the arms (h, h), which is made possible by turning the winged nuts (l, l). When the desired extension of the screen in this way has been secured these winged nuts are to be turned to produce the clutching action which renders the arrangement suitable. The wings A' A' are to be extended or not, as desired or required, which is rendered possible by loosening the winged nuts (d, d). It will be understood that the reversing of these operations will again restore the shield to its position of disuse.

I claim:—

In a wind shield for automobiles and other vehicles a combination clutch adapted to slide on a suitable rod and to control the adjustment of said wind shield in different positions and which consists of a slide-piece forked at its engaging end, and having a pin rising therefrom, a lower clutch member removably mounted on said slide piece,— and an upper clutch-member revolubly hung on said pin and adapted to engage said lower member as occasion requires.

ALONSON D. PERKINS.

Witnesses:
W. P. PREBLE,
BEATRICE COHEN.